Dec. 1, 1931.   W. J. MORRILL   1,834,860

DYNAMO ELECTRIC MACHINE

Filed Feb. 24, 1930

Inventor:
Wayne J. Morrill,
by Charles E. Tullar
His Attorney.

Patented Dec. 1, 1931

1,834,860

UNITED STATES PATENT OFFICE

WAYNE J. MORRILL, OF FORT WAYNE, INDIANA, ASSIGNOR TO GENERAL ELECTRIC COMPANY, A CORPORATION OF NEW YORK

DYNAMO ELECTRIC MACHINE

Application filed February 24, 1930. Serial No. 430,695.

My invention relates to dynamo electric machines of the type which are subject to vibration about their axes due to pulsating torque such, for example, as single phase motors.

Various devices have been suggested heretofore for reducing the vibration of a machine of this kind, such as mounting the motor on springs, vibration absorbing pads, or providing a resilient support for the rotor bearings. These devices have been subject to the disadvantage that they are cumbersome, expensive to manufacture, subject to deterioration, and do not rigidly support the motor shaft.

The object of my invention is to provide a vibration absorbing device for a dynamo electric machine of this kind, which is simple in construction and does not require any resilient mounting for the frame of the machine, or its bearings, so that the shaft is rigidly supported. I accomplish this by resiliently supporting a weight on the stationary member of the machine by an arrangement including a spring and make the natural period of vibration of the weight and spring correspond to the frequency of vibration of the stationary member. In this way the vibration of the weight and spring serves to oppose and greatly reduces the vibration of the stationary member.

My invention will be more fully set forth in the following description referring to the accompanying drawings, and the features of novelty which characterize my invention will be pointed out with particularity in the claims annexed to and forming a part of this specification.

Figure 1:
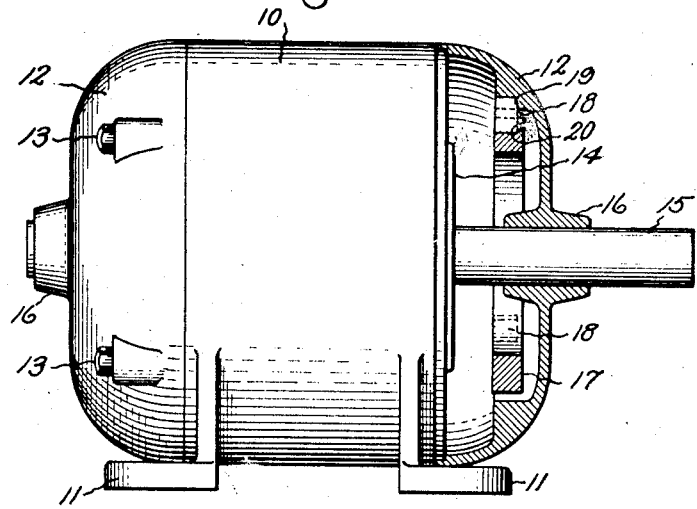
Figure 2:
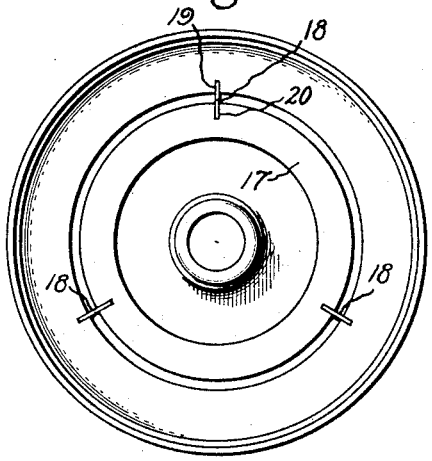

In the drawings Fig. 1 is a side elevation of a single phase motor embodying my invention, the end-head being shown in longitudinal section, and Fig. 2 is a view of the inside of the end-head of the motor shown in Fig. 1.

Referring to the drawings, I have shown my invention in connection with a single phase motor having a stationary member including a frame 10 provided with feet 11 for securing the motor to any suitable support. The stationary member also includes end-heads 12 which are secured to the frame by bolts 13, and the rotatable member 14 of the motor includes a shaft 15 which is supported in bearings 16 carried by the end-heads.

In a motor of this type the torque pulsates so as to produce considerable vibration of the stationary member. This vibration is greatly reduced, in accordance with my invention, by supporting a weight thereon by springs and proportioning the weight and the springs so that they have a natural period of vibration corresponding in frequency with the vibration of the stationary member of the motor which is caused by its pulsating torque. This may be accomplished by the various arrangements of parts, but I prefer to provide an annular weight 17 arranged inside of one of the end-heads 12 and coaxial with the shaft 15. The weight is secured in the end-head by radially arranged, flat springs 18, which are secured in radial slots 19 and 20 formed in the weight and the end-heads respectively. The springs 18 are therefore resilient to circumferential vibrations of the weight 17, but rigidly resist movement of the weight in any other direction. The weight 17 and the strength of the springs 18 are made so that the natural period of vibration of the weight and the springs is the same in frequency as the vibration of the stationary member 10 due to the pulsating torque of the motor. By this construction the vibration of the motor is substantially eliminated without the necessity of providing any resilient supports for the motor or its bearings.

Modifications of the form of my invention which I have illustrated will occur to those skilled in the art, so that I do not desire my invention to be limited thereto, and I intend in the appended claims to cover all modifications thereof which do not depart from the spirit and scope of my invention.

What I claim as new and desire to secure by Letters Patent of the United States, is,—

1. A dynamo-electric machine of the type subject to pulsating torque having rotatable and stationary members, and means including an annular weight arranged about the axis of the machine and resiliently secured to said stationary member for reducing vibration thereof.

2. A dynamo-electric machine of the type subject to pulsating torque having rotatable and stationary members, and means including an annular weight and a plurality of radially arranged springs securing said weight to said stationary member for reducing vibration of said stationary member.

3. A dynamo-electric machine of the type subject to pulsating torque having rotatable and stationary members, and means including a weight arranged inside of said stationary member and resiliently connected thereto for reducing vibration of said stationary member.

4. A dynamo-electric machine of the type subject to pulsating torque having rotatable and stationary members, and means including an annular weight arranged inside of said stationary member above the axis thereof and a spring securing the same thereto for reducing vibration of said stationary member.

5. A dynamo-electric machine of the type subject to pulsating torque having rotatable and stationary members, and means including an annular weight arranged inside of said stationary member and a plurality of radially arranged springs for securing said weight therein for reducing vibration of said stationary member.

6. A dynamo-electric machine of the type subject to pulsating torque having rotatable and stationary members, and means including an annular weight arranged inside of said stationary member and a plurality of radially arranged, flat springs securing the same therein for reducing vibration of said stationary member.

7. A dynamo-electric machine of the type subject to pulsating torque having rotatable and stationary members, said stationary member having an end-head, and means including an annular weight arranged inside of said end-head and secured therein by springs for reducing vibration of said stationary member.

8. A dynamo-electric machine of the type subject to pulsating torque having rotatable and stationary members, said stationary member having an end-head, and means including an annular weight arranged inside of said end-head and radially arranged, flat springs securing said weight therein for reducing vibration of said stationary member.

In witness whereof, I have hereunto set my hand this 20th day of February, 1930.

WAYNE J. MORRILL.